US012715441B2

(12) United States Patent
Berner et al.

(10) Patent No.: US 12,715,441 B2
(45) Date of Patent: Aug. 25, 2026

(54) ASSISTANT FOR TURNING AT A JUNCTION WITH A VEHICLE

(71) Applicant: DAIMLER TRUCK AG, Leinfelden-Echterdingen (DE)

(72) Inventors: Michael Berner, Remseck (DE); Thomas Passegger, Reutlingen (DE); Rajat Sahore, Stuttgart (DE); Tobias Schwalb, Leinfelden-Echterdingen (DE)

(73) Assignee: DAIMLER TRUCK AG, Leinfelden-Echterdingen (DE)

( * ) Notice: Subject to any disclaimer, the term of this patent is extended or adjusted under 35 U.S.C. 154(b) by 41 days.

(21) Appl. No.: 18/743,652

(22) Filed: Jun. 14, 2024

(65) Prior Publication Data

US 2024/0416914 A1 Dec. 19, 2024

(30) Foreign Application Priority Data

Jun. 16, 2023 (DE) ..................... 10 2023 115 824.4

(51) Int. Cl.
*B60W 30/18* (2012.01)
*B60W 30/095* (2012.01)

(52) U.S. Cl.
CPC .. *B60W 30/18159* (2020.02); *B60W 30/0953* (2013.01); *B60W 30/0956* (2013.01); *B60W 2300/145* (2013.01); *B60W 2552/50* (2020.02); *B60W 2552/53* (2020.02)

(58) Field of Classification Search
CPC ..... B60W 30/18145; B60W 30/18159; B60W 2300/14; B60W 2300/145; B60W 2530/201; B60W 2530/205; B60Y 2200/147
See application file for complete search history.

(56) References Cited

U.S. PATENT DOCUMENTS

| | | | | |
|---|---|---|---|---|
| 11,794,809 | B1 * | 10/2023 | Alghooneh .......... | B62D 15/021 |
| 12,110,018 | B2 * | 10/2024 | Oh ........................ | B60W 40/06 |
| 2017/0247032 | A1 * | 8/2017 | Lee ....................... | B60W 30/12 |
| 2021/0197852 | A1 * | 7/2021 | Fairfield ............... | B60W 40/04 |
| 2022/0161782 | A1 * | 5/2022 | Laine ..................... | G08G 1/167 |
| 2023/0138848 | A1 * | 5/2023 | Larsson ................. | B60K 35/81 701/41 |

FOREIGN PATENT DOCUMENTS

| | | | | |
|---|---|---|---|---|
| DE | 102004048530 A1 | | 4/2006 | |
| DE | 102010025612 A1 | | 3/2011 | |
| DE | 102009047264 A1 | | 6/2011 | |
| DE | 102017215316 A1 | | 3/2019 | |
| DE | 102018214551 A1 | | 3/2020 | |
| EP | 4095018 A1 | * | 11/2022 | ......... G01C 21/3697 |

OTHER PUBLICATIONS

English Translation of DE 102004048530 A1.*
English Translation of DE 102010025612 A1.*
Examination Report created Jan. 29, 2024 in related/corresponding DE Application No. 10 2023 115 824.4.

* cited by examiner

*Primary Examiner* — Anshul Sood
(74) *Attorney, Agent, or Firm* — PATENT PORTFOLIO BUILDERS PLLC

(57) ABSTRACT

An assistant for turning at a junction or a roundabout or for cornering with a vehicle which is a commercial vehicle or a bus, the assistant suggests a suitable time to turn. The assistant detects a curb at least on a right side of the vehicle using at least one sensor, and suggest optically and/or acoustically in the vehicle a time to turn, resulting in a swept path of the vehicle that avoids contact with the curb.

14 Claims, 6 Drawing Sheets

ASSISTANT FOR TURNING AT A JUNCTION WITH A VEHICLE

CROSS-REFERENCE TO RELATED APPLICATIONS

Figure 1:
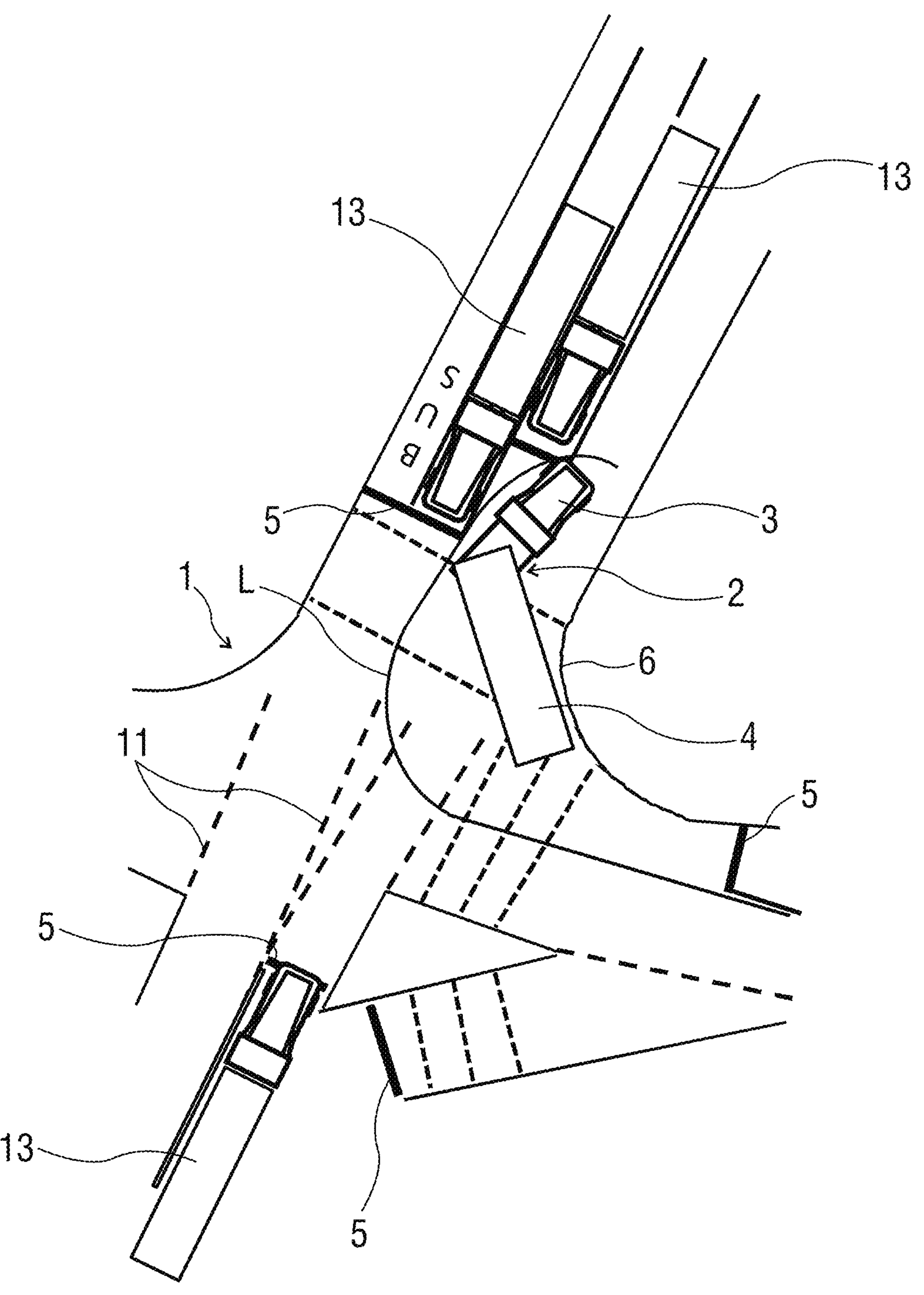

This application claims priority under 35 U.S.C. § 119 to German patent application 10 2023 115 824.4, filed on Jun. 16, 2023, the entire disclosure of which is herein expressly incorporated by reference.

BACKGROUND AND SUMMARY OF THE INVENTION

Exemplary embodiments of the invention relate to an assistant for turning at a junction or a roundabout or for cornering with a vehicle, which is in particular a commercial vehicle or bus.

In road traffic, for example in urban delivery traffic, commercial vehicles, for example heavy goods vehicles and buses cross junctions. Particularly when turning right, heavy goods vehicles with semi-trailers, heavy goods vehicles with trailers, and buses must follow a suitable trajectory to avoid running into oncoming traffic and to avoid driving over the curb which is often present on the right-hand side of the vehicle.

In order to turn into the curve at the right time and to find the right trajectory, driver experience is required. In order to turn right into the target road, the vehicle usually drives straight ahead or to the left before turning completely to the right.

DE 10 2018 214 551 A1 describes a method for assisting a driver with a turning maneuver, in particular in the case of particularly tight curves. In this case, there is the danger of side impact during tight cornering. Furthermore, a correspondingly designed system arrangement is described. Furthermore, a computer program product is proposed which has control commands that execute the method or operate the proposed system arrangement.

Exemplary embodiments of the invention are directed to a novel assistant for turning at a junction or a roundabout or for cornering with a vehicle, which, is in particular, a commercial vehicle or bus.

An assistant for turning at a junction or a roundabout or for cornering with a vehicle that is a commercial vehicle or a bus is a technical system that is set up to propose a suitable time to turn for the respective turning maneuver. According to the invention, the assistant is set up to detect a curb at least on a right side of the vehicle by means of at least one sensor of the vehicle and to suggest optically and/or acoustically in the vehicle a time to turn, resulting in a swept path of the vehicle that avoids contact with the curb.

Alternatively, or additionally, the assistant can be set up to propose an optimal trajectory.

At the entrance to the junction or curve or roundabout, the curb, in particular on the ride side of the vehicle, can be detected, for example while driving straight ahead, by means of at least one sensor, e.g., at least one ultrasound sensor and/or at least one radar sensor and/or at least one lidar sensor and/or at least one camera. The sensors or some of the sensors can be arranged as forward-looking sensors, i.e., directed forwards in a longitudinal direction.

In one embodiment, the assistant is set up to determine, before turning, a total length of the vehicle and/or a position of the rear wheels of a semi-trailer or trailer of the vehicle, which is a commercial vehicle combination, via a mirror replacement camera present on the vehicle. Alternatively, the length of the vehicle can be stored in a control device and the assistant can be set up to read out the length. The length and/or the position of the rear wheels is considered by the assistant in order to identify a swept path. Furthermore, in order to identify the swept path, the assistant can be set up to consider whether a lift axle optionally present on the vehicle is raised or lowered.

Recognition by means of the mirror replacement camera can be performed well when cornering while driving, as the semi-trailer or the trailer is easier to see and can be measured by an algorithm on the basis of the steering angle.

For example, data of the commercial vehicle combination is determined, in particular the lengths of a tractor unit and the semi-trailer or trailer and/or the axle distances and articulation points determined by these, which identify the kinematic behavior of the commercial vehicle combination. This largely dictates the swept path of the commercial vehicle combination, with the end of the commercial vehicle combination driving around a curve with a smaller radius than the tractor unit. The length of the commercial vehicle combination can be determined by a control device installed in the commercial vehicle combination by retrieving the data of the semi-trailer or trailer and the data of the tractor unit.

In one embodiment, the assistant is set up to recognize a junction or a curve or a roundabout up ahead based on map data of a navigation system and a position of the vehicle determined by means of the navigation system and to recognize an intention to turn on the basis of an activated indicator of the vehicle and/or route planning.

In one embodiment, the assistant is further set up to detect characteristics of the junction or the curve or the roundabout, in particular including lane markings and/or lanes and positions of other road users by means of at least one of the sensors, to determine an optimal trajectory for turning from the individual position of the vehicle, the position of the wheels and/or the length of the vehicle, if necessary the angle of the semi-trailer or trailer to the towing vehicle, the position of the curb, the characteristics of the junction or the curve or the roundabout and the position of the other road users, and optionally to constantly adapt the trajectory on the basis of already conducted steering movements, the distance travelled and changes in the positions of the other road users.

The trajectory can be displayed to the driver and/or haptic feedback can be generated in order to assist the driver in following the trajectory.

The information for the junction can also be supplemented by map data stored in the vehicle or additional information can be loaded via a backend. For example, the data can contain predefined driving corridors for turning at the specific junction.

In one embodiment, the determined trajectory is displayed to the driver, such that they can follow this. This trajectory can be displayed in a head-up display or in a human-machine interface, e.g., a navigation system, such that the current and the calculated optimal trajectory are shown superimposed. To simplify matters, the driver can also be shown whether to steer to the right, to the left, or straight ahead. In addition, a distance can be displayed, for example by means of a bar graph, that the driver still has to drive before they can turn completely to the right and in the process no longer touch the curb with the rear wheels of the semi-trailer or trailer. In this case, the driver is still responsible for controlling the vehicle with the accelerator, brakes and steering.

Additionally, or alternatively, acoustic signals relating to the steering and/or the distance can be output to assist the driver (similar to a distance warning system in a passenger car). Optionally, the steering and/or acceleration and/or braking can also be supported by haptic interventions or can be carried out completely by an automated driving system after the information has been detected.

In one embodiment, the assistant is set up to derive or to take different curve radii for the respective junction or curve or roundabout from map data of a navigation system, wherein separate data is stored for each possible turning maneuver of each lane and each direction.

In this case, the turning radii can be calculated or are stored from geometric information, e.g., shape points. Therefore, separate data is or will be stored for each possible turning maneuver at the junction (e.g., right turn, left turn, diagonal left turn, etc.) for each lane and each direction.

In one embodiment, the assistant is set up to use the determined data of the vehicle and the respective turning radius to calculate whether there is an increased danger of collision with other road users or the curb or other infrastructure for the upcoming turning maneuver and, when multiple lanes are present, to output a lane recommendation for the upcoming turning maneuver when approaching the junction or curve or the roundabout.

Furthermore, it can be provided that a warning is output to the driver in the case that this turning maneuver is associated with increased danger, so that the driver can pull outwards.

Here, for a relatively long commercial vehicle combination, the outer (right-hand) lane can be recommended, for example, when there are several lanes for turning left, and the other lane can also be recommended for a short commercial vehicle combination if this is advantageous for the following route. In this case, the driver is notified as soon as a lane change is possible in order to ensure that the vehicle can get into the lane in good time.

Additionally, it can be checked whether the turning maneuver exceeds a threshold in the chosen lane. If this is the case, a corresponding notification is displayed in the navigation system and/or an acoustic notification is output. This can be applied both to turning processes with a single lane and with multiple lanes. This notification is output before reaching the junction so that the driver can consider this early on in the turning maneuver. For example, the driver can "pull outwards" early or can benefit from the maximum turning radius permitted by the present situation in order to avoid collisions with the infrastructure or similar.

The threshold can be determined by means of a predictive calculation and/or simulation of the swept path from the turning radius of the lane, in which the commercial vehicle combination is located, the length of the commercial vehicle combination, the position of the axles of the commercial vehicle combination (and whether these are raised) and the articulation angle of the commercial vehicle combination, and maps the extent to which the commercial vehicle combination leaves the expected lane (curve) and/or collides with the infrastructure. If this extent is too great (or the distance to the infrastructure is too small), the threshold is exceeded, and the warning described here is output.

In one embodiment, furthermore, a geometry and a design of the junction or the curve or the roundabout is stored in the map data in the navigation system, in particular including an individual lane width at different points along the lanes and/or the navigability of shoulders and/or the position of traffic islands and/or roadside development and/or curbs and/or lane markings and/or stop lines of the lanes, wherein the assistant is set up to calculate a possible static free space from this data, within which the vehicle can move.

In one embodiment, the assistant is set up to use the at least one sensor to determine real lane markings, a lane width, and/or real positions of other road users in order to ascertain if and where the latter have stopped on a stop line or if another lane is free, and thus to ascertain if there is additional free space or less free space available in comparison to the static free space.

Some turning movements are only possible for commercial vehicle combinations if special turning maneuvers are carried out in the process. This includes getting into the lane, using other lanes (lanes going in other directions or oncoming traffic lanes), and/or turning in late. In addition, solid lines or restricted areas must also be driven over sometimes.

In one embodiment, the assistant is set up to output a detailed recommendation in the form of a pictogram in an optical display and/or as an acoustic notification when an upcoming turning maneuver is recognized, wherein the recommendation comprises:

- a lane recommendation for approaching the junction and/or with regard to a target lane, and/or
- a recommendation to keep particularly far left or right within one's own lane.

The recommendation can additionally comprise a recommendation about how the turning maneuver should be carried out. For example, the driver should drive straight ahead for a long time and turn sharply late. In particular, the recommendation can involve three phases: getting into position before the turn (which lane and the position inside the lane), the turning across the junction, and the entering the target lane (which lane and the position inside the lane).

The recommendation can be based on the data from previous steps, the threshold values for a maneuver and a priority rating. The threshold values can specify how close the commercial vehicle combination or the wheels of the semi-trailer or trailer come to the infrastructure or other road users (or the oncoming traffic). Different recommendations can be made depending on this.

In one embodiment, the assistant is set up to suggest the least complex trajectory with the lowest risk from a selection of multiple trajectories for the turning maneuver.

For example, a later turn is preferred to using another lane, or sharing a lane in the opposite direction is only recommended if turning is not possible otherwise.

Alternatively, the vehicle's route can be planned differently as early as possible and a diversion taken if necessary to avoid a turning maneuver completely.

Exemplary embodiments of the invention are explained in more detail in the following using the drawings.

BRIEF DESCRIPTION OF THE DRAWING FIGURES

Figure 2:
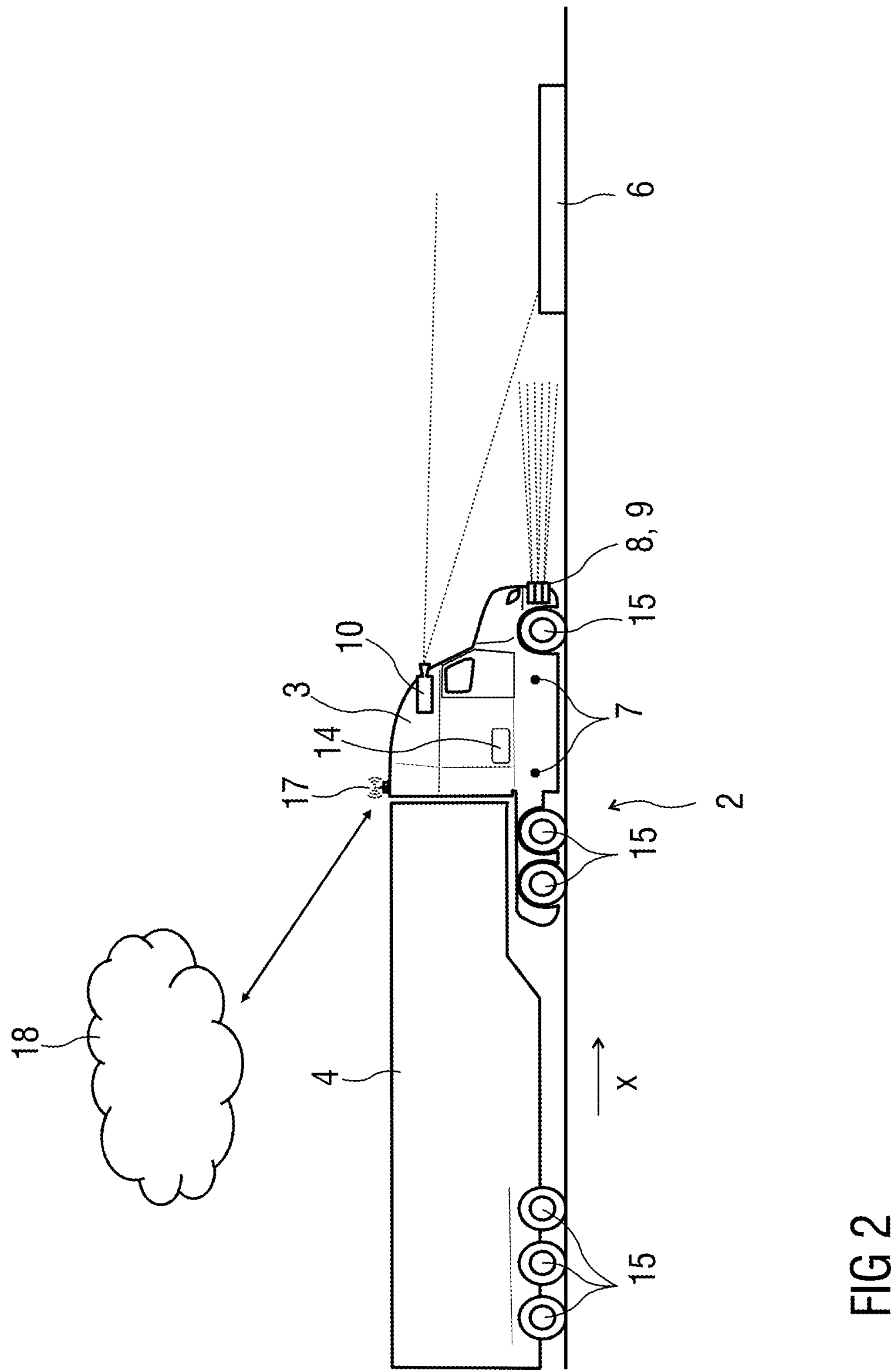
Figure 3:
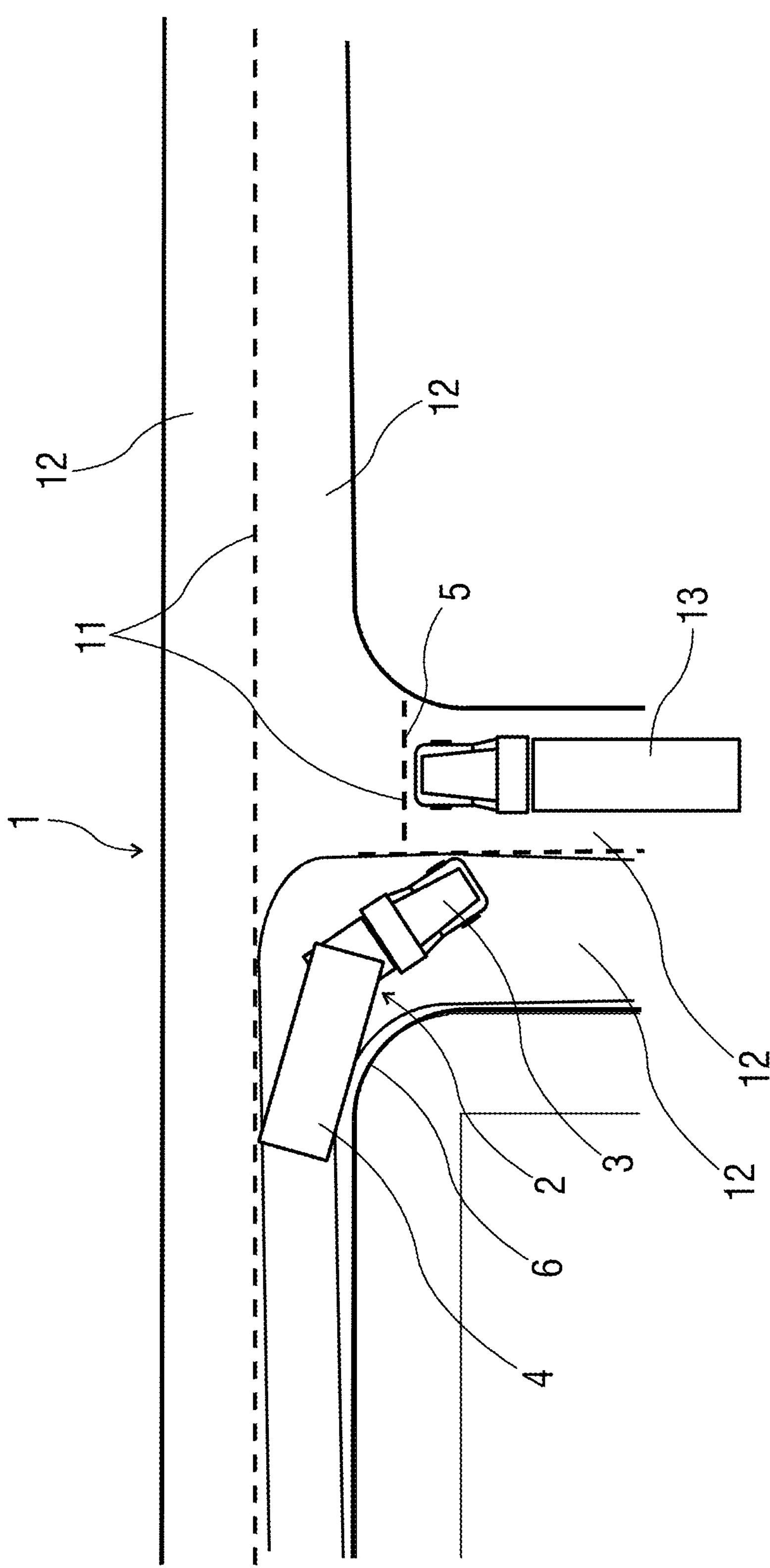
Figure 4:
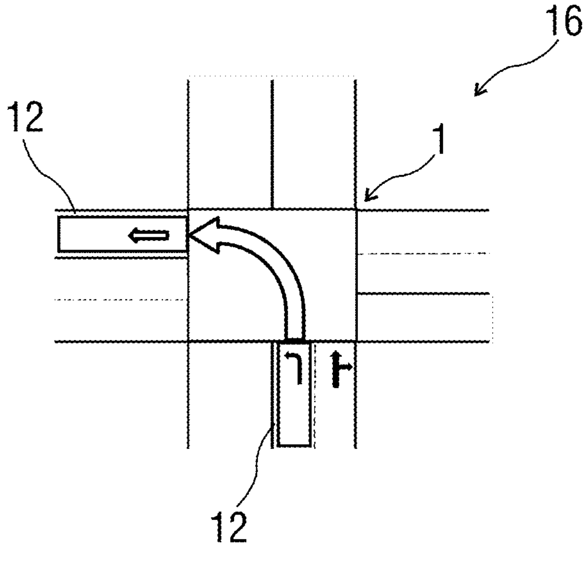
Figure 5:
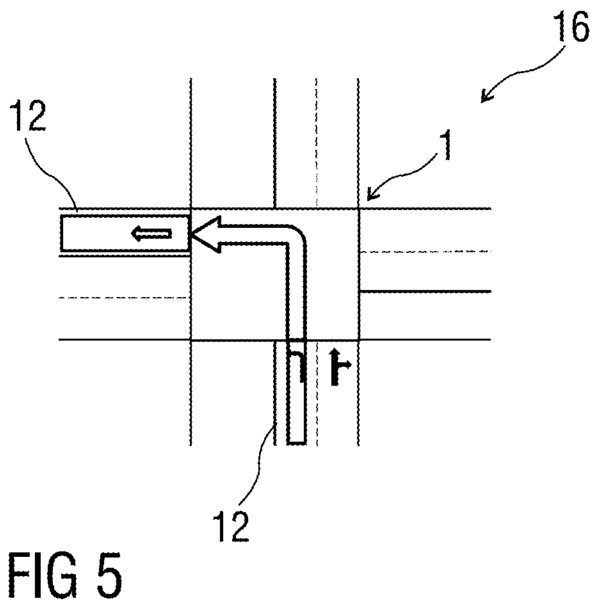
Figure 6:
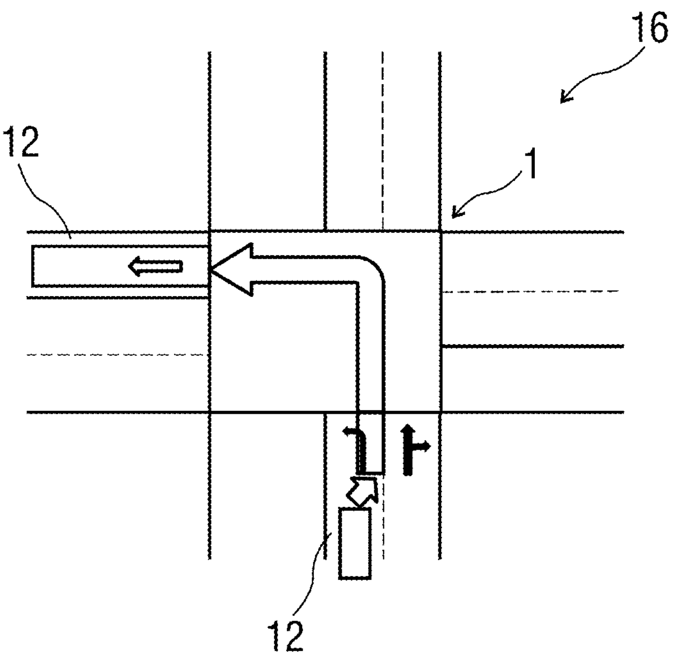
Figure 7:
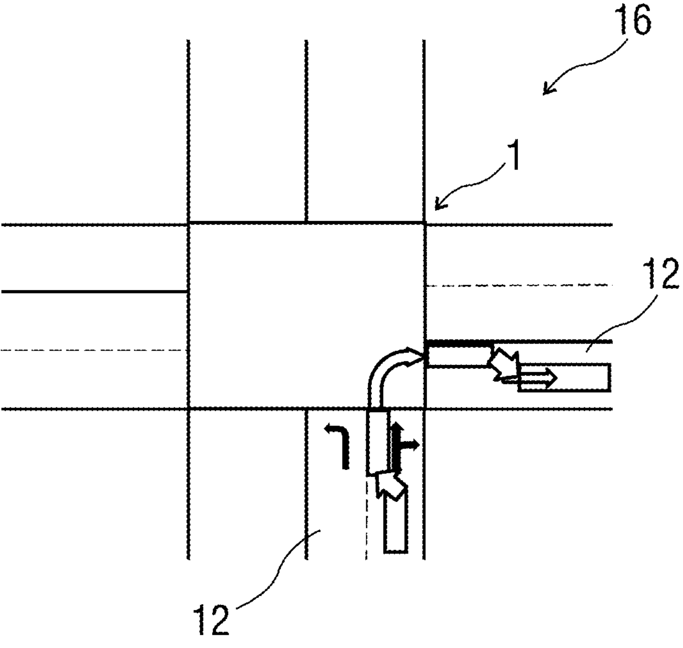
Figure 8:
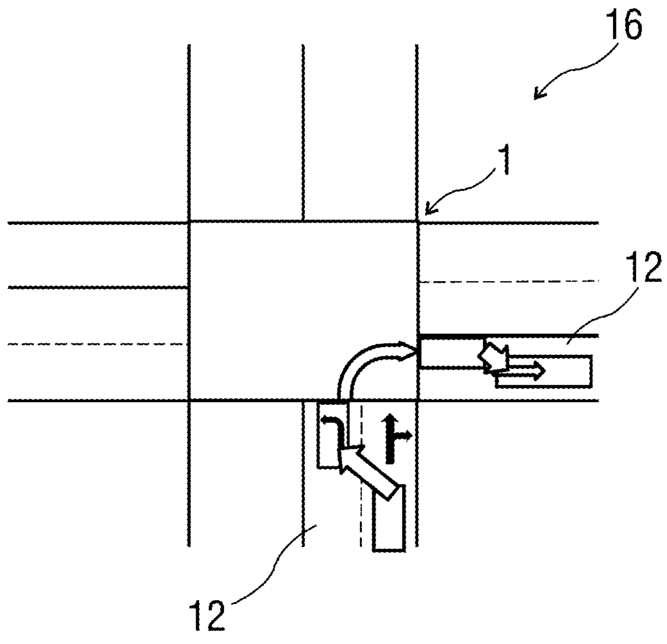
Figure 9:
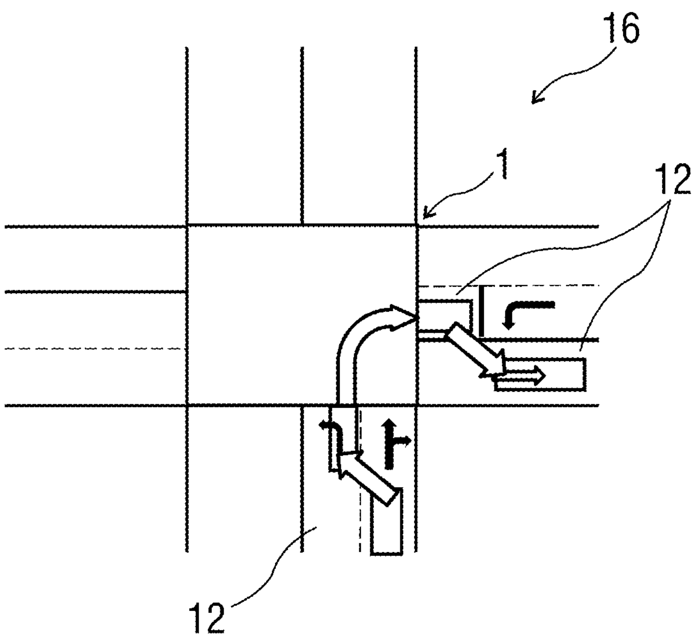

Here:

FIG. 1 shows a schematic view of a junction with multiple lanes when a vehicle is turning right, FIG. 2 shows a schematic view of a vehicle, FIG. 3 shows a schematic view of a junction when a vehicle is turning right, FIG. 4 shows a schematic view of an exemplary pictogram to be displayed in a display, which represents a junction with recommended lanes for a normal left turn, FIG. 5 shows a schematic view of an exemplary pictogram to be displayed in the display, which represents a junction with recommended lanes for the left turn, at which junction the driver should drive straight ahead for longer and turn left late, FIG. 6 shows a schematic view of an exemplary pictogram to be displayed in the display, which represents a junction with recommended lanes for the left turn, at which junction the driver positions their vehicle far right in their own lane and should then drive straight ahead for longer and turn left late, FIG. 7 shows a schematic view of an exemplary pictogram to be displayed in the display, which represents a junction with recommended lanes for the right turn, at which junction the driver positions their vehicle far left in their own lane and should drive into the target lane far to the left after the right turn, FIG. 8 shows a schematic view of an exemplary pictogram to be displayed in the display, which represents a junction with recommended lanes for the right turn, at which junction the driver positions their vehicle using the left adjacent lane before turning and should drive into the target lane far to the left after turning right, and FIG. 9 shows a schematic view of an exemplary pictogram to be displayed in the display, which represents a junction with recommended lanes for the right turn, at which junction the driver positions their vehicle using the left adjacent lane before turning and should drive partially across the opposite lane into the target lane after the right turn.

Parts corresponding to each other are provided with the same reference numerals in all the figures.

DETAILED DESCRIPTION

FIG. 1 is a schematic view of a junction 1 having multiple lanes when a vehicle 2 is turning right, in particular a commercial vehicle 2, for example a commercial vehicle combination 2 comprising a tractor unit 3 and a semi-trailer 4.

With a commercial vehicle combination 2 with a semi-trailer 4 or trailer, the driver must consider that the semi-trailer 4 or trailer drives a smaller turning radius (so-called swept path) than the tractor unit 3. Therefore, the driver must initially drive straight ahead and cannot turn into the curve immediately. Right-hand curves are thus critical as these have the smallest turning radius and are partially restricted on the right side by a curb 6. On tight bends, drivers therefore deliberately approach the bend far to the left or initially steer to the left before turning to the right, in order to position the swept path of the semi-trailer 4 or trailer further to the left. This is similar with a bus. Here too, the bus driver drives straight ahead at first before turning into the curve. However, the trajectory is slightly different, due to the absence of the articulated joint and the wheels being offset to the middle of the vehicle.

If the driver turns into the right curve too early, usually the trailer or semi-trailer 4 encounters the curb 6 or drives over the curb 6, which can lead to damage to the tires on the one hand, and on the other hand can also endanger pedestrians on the adjacent pavement. If the driver turns in too late, the commercial vehicle combination 2 will end up in the oncoming traffic or will not make it around the curve.

At junctions 1, lanes and/or stop lines 5 are often shifted backwards to make it possible for commercial vehicle combinations 2 or buses to turn at all. The line L in FIG. 1 shows the outer path of the tractor unit 3 and/or the semi-trailer 4.

FIG. 2 shows a schematic view of a vehicle 2, in particular a commercial vehicle combination 2 with a tractor unit 3 and a semi-trailer 4.

According to one aspect of the present invention, the driver in the tractor unit 3 is assisted with complex junction situations and an optimal trajectory and/or suitable time to turn-in is proposed to the driver.

In this case, a total length of the commercial vehicle combination 2 or a position of the rear wheels 15 of the semi-trailer 4 or trailer is determined before the turn via a mirror-replacement camera (MirrorCam) present on the tractor unit 3. Furthermore, it can be determined via the mirror replacement camera if any lift axle present on the vehicle is raised or lowered. This can be performed well when cornering while driving, as the semi-trailer 4 or the trailer is easier to see in this case and can be measured by an algorithm on the basis of the steering angle. Alternatively, the length of the semi-trailer 4 or the trailer can be read out via any present control devices.

FIG. 3 is a schematic view of a junction 1 when a vehicle 2 is turning right, in particular a commercial vehicle combination 2 comprising a tractor unit 3 and a semi-trailer 4.

At the junction 1, the driver's turning intention is registered in a first step. The junction 1 is recognized on the basis of map data of a navigation system. The turning intention is recognized by an activated indicator.

At the entrance to the junction 1, the curb 6 on the ride side of the vehicle 2 is detected, for example while driving straight ahead, by means of at least one sensor, e.g., at least one ultrasound sensor 7 and/or at least one radar sensor 8 and/or at least one lidar sensor 9 and/or at least one camera 10.

The sensors or some of the sensors can be arranged as forward-looking, i.e., directed forwards in a longitudinal direction x, sensors, for example the at least one radar sensor 8 and/or the at least one lidar sensor 9 and/or the at least one camera 10. Additional characteristics of the junction 1, mainly relating to lane markings 11 and/or lanes 12, are detected with at least one of the forward-looking sensors. Furthermore, the positions of other road users 13, for example passenger cars, heavy goods vehicles, motorcycles, are detected by at least one of the sensors, as these can represent obstacles to turning for the commercial vehicle combination 2.

Information for the junction 1 can also be supplemented by map data stored in the vehicle 2 or additional information can be loaded via a wireless communication interface 17 from a backend 18 or a cloud 18. For example, the data can contain predefined optimum driving corridors for the turning at the specific junction 1.

From the information consisting of an individual position of the vehicle 2, position of the wheels 15 on the semi-trailer 4 or trailer in relation to the tractor unit 3, position of the curb 6 on the right side of the tractor unit 3, characteristics of the junction 1, and position of the other road users 13, a control device 14 of the vehicle 2 or the backend 18 determines the optimal trajectory for turning. This trajectory is constantly adapted based on the steering movements already carried out by the driver and the driven distance. Also, the route is adapted when the positions of other road users 13 change.

In one embodiment, the determined trajectory is displayed to the driver so that they can follow this. This trajectory can be displayed in a head-up display or in a human-machine interface, e.g., a navigation system, so that the current and the calculated optimal trajectory are shown superimposed. To simplify matters, the driver can also be shown whether to steer to the right, to the left, or straight ahead. In addition, a distance can be displayed, for example by means of a bar graph, that the driver still has to drive before they can turn completely to the right and in the process no longer touch the curb 6 with the rear wheels 15 of the semi-trailer 4 or trailer. In this case, the driver is still responsible for controlling the vehicle with the accelerator, brakes and steering.

Additionally, or alternatively, acoustic signals relating to the steering and/or the distance can be output to assist the driver (similar to a distance warning system in a passenger car). Optionally, the steering and/or acceleration and/or braking can also be supported by haptic interventions or can be carried out completely by an automated driving system after the information has been detected.

In a greatly simplified embodiment, only the curb 6 is detected, but not the junction 1 and the other road users 13, and the driver is shown when they can turn without touching the curb 6.

Increased safety by avoiding collisions with the curb 6 (and thus damaging the tires) and other road users results from the described invention. Furthermore, there is a gain in comfort as driving over complex junctions 1 is simplified and additional maneuvering is avoided, if necessary, thereby also saving time.

Commercial vehicle combinations 2, in particular heavy good vehicles, with semi-trailers 4 or trailers drive in road traffic over junctions 1 and therefore perform a turning maneuver when making a right or left. This applies both to junctions 1, where two roads intersect, and to junctions 1 where one road joins another road.

With such turning maneuvers it is important that the driver with their commercial vehicle combination 2 does not collide with other vehicles or the infrastructure (guard rail, streetlamp, curb 6 etc.), in order to avoid causing any damage to the vehicle 2 and the infrastructure. Some turning movements or turning radii are very tight at junctions 1, meaning that the driver must carry out special driving maneuvers in order to successfully carry out the turn.

The chosen turning maneuver is thus dependent on different factors. These relate on the one hand to the commercial vehicle combination 2 (for the most part its length), but also to the design of the junction 1 in relation to the radius of the curve to be travelled and the distribution and/or design of the lanes 12. Here, not only the lane 12 of the commercial vehicle combination 2 is considered, but also the other lanes 12 which lead in the same direction, and the lanes 12 of the oncoming traffic. These factors must be correspondingly assessed and considered by the driver in order to choose the right driving maneuver and to carry this out. In this case, there is also the difficulty that the driver cannot always correctly recognize all these factors in good time at some junctions 1 because of the design of the junction 1 or other factors, such as for example darkness or reduced visibility.

Selecting the most suitable and/or most advantageous turning maneuver is usually based on the driver's experience. The driver selects the maneuver based on their assessment of the turning radii, the lanes 12, and the design of the junction 1, as well as their past experience. The number of times the driver has travelled through the respective junction 1 and is therefore familiar with the various scenarios and trajectories to be driven can play a role here.

As already described, not all criteria are always directly recognizable in all situations during the turning maneuver. For example, due to building development, a target lane may only be recognized relatively late during the turning process or the lane marking 11 and/or the turning radii on the road may be difficult to assess due to darkness.

A navigation system on which the junction is displayed for the driver can serve as an aid. However, the display here is usually only schematic, making it difficult to estimate the turning radii and the layout of junction 1. Many navigation systems also have a lane display. However, this only applies to navigation and in rare cases, if there are several lanes 12, the outer lane 12 is recommended, as this usually offers the better radius for a commercial vehicle combination 2.

According to one aspect of the present invention, it is provided to display in the tractor unit 3, in particular in a navigation system, notifications and/or suggestions for advantageous turning maneuvers at junctions for a driver.

To this end, in a first step, data of the commercial vehicle combination 2 is determined, in particular the lengths of the tractor unit 3 and the semi-trailer 4 or trailer and/or the axle distances and articulation points determined by these, which identify the kinematic behavior of the commercial vehicle combination 2. This largely dictates the swept path of the commercial vehicle combination 2, with the end of the commercial vehicle combination 2 driving around a curve with smaller radius than the tractor unit 3. The length of the commercial vehicle combination 2 can be determined by a control device installed in the commercial vehicle combination 2 by retrieving the data of the semi-trailer 4 or trailer and the data of the tractor unit 3.

In a second step of an embodiment, different turning radii for the respective junction 1 are derived or taken from map data of the navigation system. Here, the turning radii can be calculated or are stored from geometric information, e.g., shape points. Therefore, separate data is or will be stored for each possible turning maneuver at the junction 1 (e.g. right turn, left turn, diagonal left turn, etc.) for each lane 12 and each direction.

In a third step, while driving it is determined by route planning and a current position of the commercial vehicle combination 2 whether the commercial vehicle combination 2 is approaching a junction 1, at which a turning maneuver is intended. Alternatively, an upcoming turning maneuver is determined based on the position, direction of travel (approaching a junction 1), and a driving direction signal, in particular an indicator.

For this turning maneuver it is calculated, based on the data of the commercial vehicle combination 2 and of the respective turning radius determined in the first step, whether the turning maneuver is a tight turning maneuver, i.e., whether there is an increased danger of colliding with other vehicles or the infrastructure (guard rails, street lamps, curb 6, etc.). If this is the case and there are multiple lanes 12 available for the turn in the intended direction, a lane recommendation, for example, is output when approaching the junction 1. Here, the outer (right) lane can be recommended to a relatively long commercial vehicle combination 2 for example when there are several lanes 12 for turning left; the other lane can also be recommended to a short commercial vehicle combination 2 if this is advantageous for the following route. In this case, the driver is notified as soon as a lane change is possible in order to ensure that the vehicle can get into the lane in good time.

Additionally, it can be checked whether the turning maneuver exceeds a threshold in the chosen lane 12. If this is the case, a corresponding notification is displayed in the navigation system and/or an acoustic notification is output. This can be applied both to turning processes with a single lane 12 and with multiple lanes 12. This notification is output before reaching the junction 1 so that the driver can consider this early on in the turning maneuver. For example, the driver can "pull outwards" early or can benefit from the maximum turning radius permitted by the present situation in order to avoid collisions with the infrastructure or similar.

The threshold can be determined by means of a predictive calculation and/or simulation of the swept path from the turning radius of the lane 12, in which the commercial vehicle combination 2 is located, the length of the commercial vehicle combination 2, the position of the axles of the commercial vehicle combination 2 (and whether these are raised), and the articulation angle of the commercial vehicle combination 2, and maps the extent to which the commercial vehicle combination 2 leaves the expected lane 12 (curve) and/or collides with the infrastructure. If this extent is too great (or the distance to the infrastructure is too small), the threshold is exceeded, and the warning described here is output.

In a further embodiment, the geometry and the design of the junction 1 are or will be stored in the map data in the navigation system in the second step in addition to the turning radii. This includes, for example, an individual lane width at different points along the lanes 12 or the navigability of shoulders. Additionally, the design of the junction is also considered in regard to the presence and the position of traffic islands and/or roadside development and/or curbs 6. Furthermore, lane markings 11, and in particular stop lines 5 of the various lanes 12, are stored in the data of junction 1. This data is to be used to calculate a possible static free space (without taking into account other road users 13 actually present) within which the commercial vehicle combination 2, including semi-trailer 4 or trailer, can move at a junction 1.

In an optional, third step of this embodiment, additional data is determined as the commercial vehicle combination 2 approaches the junction 1 and at the junction 1 itself via sensors present on the commercial vehicle combination 2, in particular on the tractor unit 3, for example camera 10 and/or radar sensor 8 and/or lidar sensor 9, in order to improve the available information about the junction 1. For example, real lane markings 11 are recognized via a camera 10 and the lane width is determined. Furthermore, the real positions of other road users 13, for example other vehicles, can be determined, in particular to establish whether and where they have stopped at a stop line 5 or whether another lane 12 is completely unoccupied by vehicles. This real data can be used to determine whether additional free space or less free space is available for the turning maneuver compared to the static data.

In a further, for example fourth, step of this embodiment, while driving it is determined on the basis of the route planning and the current position of the vehicle 2 when the vehicle 2 is approaching a junction 1 at which a turning maneuver is planned. Alternatively, or additionally, an upcoming turning maneuver can be determined based on the position, direction of travel (approaching a junction 1), and the driving direction signal, in particular an indicator. A detailed recommendation is then issued based on the data from the previous steps. This recommendation can, for example, take the form of a pictogram 16 in a display of the navigation system and/or an acoustic notification. The following section describes in more detail the notifications and recommendations that can be issued.

Different recommendations can be issued when approaching a junction 1. In the simplest case, a lane recommendation is given. Furthermore, when approaching the junction 1, the vehicle can be given the recommendation to position itself particularly far to the left or to the right within its own lane 12 in order to gain more space when turning on the other side. For example, the driver should position the vehicle particularly far to the left in order to gain more space for the swept path of the semi-trailer 4 when turning right. In the case of an even tighter bend or a narrow lane width, it may even be recommended to use the adjacent lane 12 to create more space on the other side. The adjacent lane 12 can run in the same direction of travel, which is preferable, or it can also be an oncoming traffic lane, which the commercial vehicle combination 2 then uses for a short time when turning.

When travelling across the junction 1, the commercial vehicle combination 2 can normally follow its lane 12, normally following the left-hand lane marking 11 with the end of the semi-trailer 4 or trailer. In a tighter turning maneuver, the commercial vehicle combination 2 can drive straight ahead for longer, but then turn in later and more sharply in order to delay the swept path. However, during this late turning maneuver, the driver should ensure that they remain in the target lane. In addition, other lanes 12 can also be used here.

After crossing the junction 1, the commercial vehicle combination 2 can, in most cases drive, directly into its target lane and continue here. It is also possible to drive into the lane 12 far to the right or left. If there are several lanes 12 travelling in the same direction, the second lane 12 can also be used to create a larger radius when turning. Short-term use is also possible with a lane 12 in the opposite direction, whereby set-back stop lines 5 in particular should be taken into account.

The combination of the various possibilities of the three phases of approaching the junction 1, crossing the junction 1, and entering the target lane results in a turning maneuver, which is issued, for example, as a recommendation in the form of a pictogram 16 or acoustically. The recommendation is based on the data from previous steps, on threshold values for a maneuver and a priority rating. Less complex and less risky turning maneuvers are preferred, so that, for example, turning later is preferred compared to using another lane 12, or the use of a lane 12 in the opposite direction is only recommended if turning is otherwise not possible.

Alternatively, the route of the commercial vehicle combination 2 can be planned differently as early as possible and a diversion taken if necessary to avoid a turning maneuver at a junction 1 completely.

FIG. 4 is a schematic view of an exemplary pictogram 16 to be displayed in the display, which represents a junction 1 with recommended lanes 12 for a normal left turn.

FIG. 5 is a schematic view of an exemplary pictogram 16 to be displayed in the display, which represents a junction 1 with recommended lanes 12 for the left turn, at which junction the driver should drive straight ahead for longer and turn left late.

FIG. 6 is a schematic view of an exemplary pictogram 16 to be displayed in the display, which represents a junction 1 with recommended lanes 12 for the left turn, at which junction the driver positions their vehicle 2 far to the right in their own lane 12 and should then drive straight ahead for longer and turn left late.

FIG. 7 is a schematic view of an exemplary pictogram 16 to be displayed in the display, which represents a junction 1 with recommended lanes 12 for the right turn, at which junction the driver positions the vehicle 2 far to the left in their own lane 12 and should drive into the target lane far to the left after the right turn.

FIG. 8 is a schematic view of an exemplary pictogram 16 to be displayed in the display, which represents a junction 1 with recommended lanes 12 for the right turn, at which junction the driver positions their vehicle 2 using the left adjacent lane before turning and should drive into the target lane far to the left after turning right.

FIG. 9 is a schematic view of an exemplary pictogram 16 to be displayed in the display, which represents a junction 1 with recommended lanes 12 for the right turn, at which junction the driver positions their vehicle 2 using the left adjacent lane before turning and should drive partially across the opposite lane into the target lane after the right turn, whereby a stop line 5 of the oncoming traffic lane is taken into account.

The steps of the above-described, different embodiments can also be combined with one another.

The invention can easily be transferred to roundabouts, to tight bends with the need to use the oncoming traffic lane, and to hairpin bends.

The solution described offers an increase in safety, as collisions with objects and reversing maneuvers can be avoided. Furthermore, there is a gain in comfort with easier turning at a junction 1, especially in the case of a complex trajectory and use of other lanes 12, whereby fewer or no corrective actions are required. Time is also saved due to faster turning. It also results in lower costs due to less damage to the vehicle 2 and the infrastructure.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS

1 junction
2 vehicle, commercial vehicle, commercial vehicle combination
3 tractor unit
4 semi-trailer
5 stop line
6 curb
7 ultrasound sensor
8 radar sensor
9 lidar sensor
10 camera
11 road marking, lane marking
12 lane
13 road users
14 control device
15 wheels
16 pictogram
17 wireless communication interface
18 backend, cloud
L line
x longitudinal direction

What is claimed is:

1. A method for turning at a junction or a roundabout, or configured for cornering with a vehicle, which is a commercial vehicle or a bus, wherein the method comprises:
detecting, using at least one sensor of the vehicle, a curb at least on a right side of the vehicle;
determining, by the vehicle, an optimal trajectory for the vehicle that avoids contact with the curb;
determining, by the vehicle, a current trajectory of the vehicle; and
outputting a pictogram superimposing the optimal trajectory and the current trajectory, wherein the current trajectory is constantly determined and the optimal trajectory is constantly adapted based on the constantly determined current trajectory,
wherein the pictogram outputted when the vehicle is approaching the junction or roundabout displays separate recommendations for controlling the vehicle to get into position before the turn, while turning across the junction or roundabout, and entering a target lane the vehicle by including an illustration of the vehicle in at least in a current position of the vehicle and a position of the vehicle in the target lane and at least one directional arrow between the current position of the vehicle and the position of the vehicle in the target lane.

2. The method of claim 1, wherein
the method further comprises determining, before turning and using at least one mirror replacement camera present on the vehicle, a total length of the vehicle or a position of rear wheels of a semi-trailer or trailer of the vehicle; or
the total length of the vehicle is saved in a control device and read out, the total length or the position of the rear wheels is considered to identify a swept path.

3. The method of claim 1, further comprising:
recognizing the junction, a curve, or the roundabout up ahead based on map data of a navigation system;
determining a position of the vehicle using the navigation system; and
recognizing an intention to turn based on an activated indicator of the vehicle or route planning.

4. The method of claim 3, wherein further comprising:
detecting, using the at least one sensor, characteristics of the junction, the curve, or the roundabout, including lane markings or lanes and positions of other road users; and
determining the optimal trajectory for turning from the position of the vehicle, the position of wheels or a length of the vehicle, the position of the curb, the characteristics of the junction, the curve, or the roundabout, and the position of the other road users,
wherein the constantly adapted optimal trajectory is constantly adapted based on already conducted steering movements, a distance travelled, and changes in the positions of the other road users.

5. The method of claim 1, further comprising:
deriving or taking different curve radii for a respective junction, curve, or roundabout from map data of a navigation system, wherein separate data is stored for each possible turning maneuver of each lane and each direction.

6. The method of claim 5, further comprising:
using determined data of the vehicle and the respective turning radius to calculate whether there is an increased danger of collision with other road users, the curb, or other infrastructure for the upcoming turning maneuver; and
outputting, when multiple lanes are present and as part of the pictogram, a lane recommendation for the upcoming turning maneuver when approaching the junction, curve, or roundabout.

7. The method of claim 6, wherein a geometry and a design of the junction, curve, or roundabout is stored in the map data in the navigation system, including an individual lane width at different points along the lanes, navigability of shoulders, position of traffic islands, roadside development, curbs, lane markings, or stop lines of the lanes, wherein a possible static free space within which the vehicle can move is calculated from this data.

8. The method of claim 7, further comprising:

using the at least one sensor to determine real lane markings, a lane width, or real positions of other road users in order to determine if and where the other road users have stopped on a stop line or if another lane is free, and thus to determine if there is additional free space or less free space available compared to static free space.

9. The method of claim 1, wherein the pictogram is output in an optical display when an upcoming turning maneuver is recognized, wherein the pictogram further comprises a lane recommendation, or a recommendation to keep particularly far left or right within the vehicle's own lane.

10. The method of claim 9, further comprising:

suggesting a least complex trajectory with a lowest risk from a selection of multiple trajectories for the turning maneuver.

11. The method of claim 1, wherein the pictogram outputted when the vehicle is approaching the junction or roundabout displays separate recommendations for controlling the vehicle to get into position before the turn, while turning across the junction or roundabout, and entering a target lane the vehicle by further including an illustration of the vehicle in a further position prior to the junction or roundabout and a directional arrow between the current position and the further position.

12. The method of claim 1, wherein the pictogram outputted when the vehicle is approaching the junction or roundabout displays separate recommendations for controlling the vehicle to get into position before the turn, while turning across the junction or roundabout, and entering a target lane the vehicle by further including an illustration of the vehicle in a further position after the junction or roundabout and a directional arrow between the further position and the position of the vehicle in the target lane.

13. The method of claim 1, wherein the outputting further comprises displaying a distance between the current position of the vehicle and a position at which the vehicle can completely turn right without touching the curb.

14. The method of claim 1, wherein separate recommendations for controlling the vehicle are distinct symbols indicating whether to steer right, steer left, or maintain a current direction.

* * * * *